Aug. 8, 1939.  D. W. MORRIS  2,168,960
CLUTCH MECHANISM
Filed Jan. 31, 1938  2 Sheets-Sheet 1

Inventor:
Donald W. Morris.
by Davis, Lindsey, Smith & Shonts
Attys.

Aug. 8, 1939.  D. W. MORRIS  2,168,960

CLUTCH MECHANISM

Filed Jan. 31, 1938  2 Sheets-Sheet 2

Inventor:
Donald W. Morris.
by Davis, Lindsey, Smith & Shonts
attys.

Patented Aug. 8, 1939

2,168,960

UNITED STATES PATENT OFFICE 2,168,960

CLUTCH MECHANISM

Donald W. Morris, Racine, Wis., assignor to Twin Disc Clutch Company, Racine, Wis., a corporation of Wisconsin Application January 31, 1938, Serial No. 187,818

17 Claims. (Cl. 192—48)

My invention relates to a clutch mechanism for effecting a transmission of power between driving and driven shafts and is more particularly concerned with providing a mechanism of this character of the mechanically loaded type.

The present invention is preferably embodied in a dual clutch construction having a common clamping plate which is mechanically loaded, as distinguished from spring loading, when either clutch is engaged, the clutch elements including the plate being preferably mounted in an enclosing casing to thereby permit the use of dry clutches, although the construction may be adapted to operate in an oil bath.

The principal object of the invention is to provide an operating means for engaging either clutch which includes a non-elastic train of elements composed of co-acting levers and inclined surfaces for applying pressure to the clamping plate.

A further object is to devise a clutch construction in which the operating levers are held in driving position against inadvertent release and maintained in non-rattling, release position by an arrangement which obviates the use of clamps.

These and further objects of my invention will be set forth in the following specification, reference being had to the accompanying drawings, and the novel means by which said objects are effectuated will be definitely pointed out in the claims.

Figure 1:
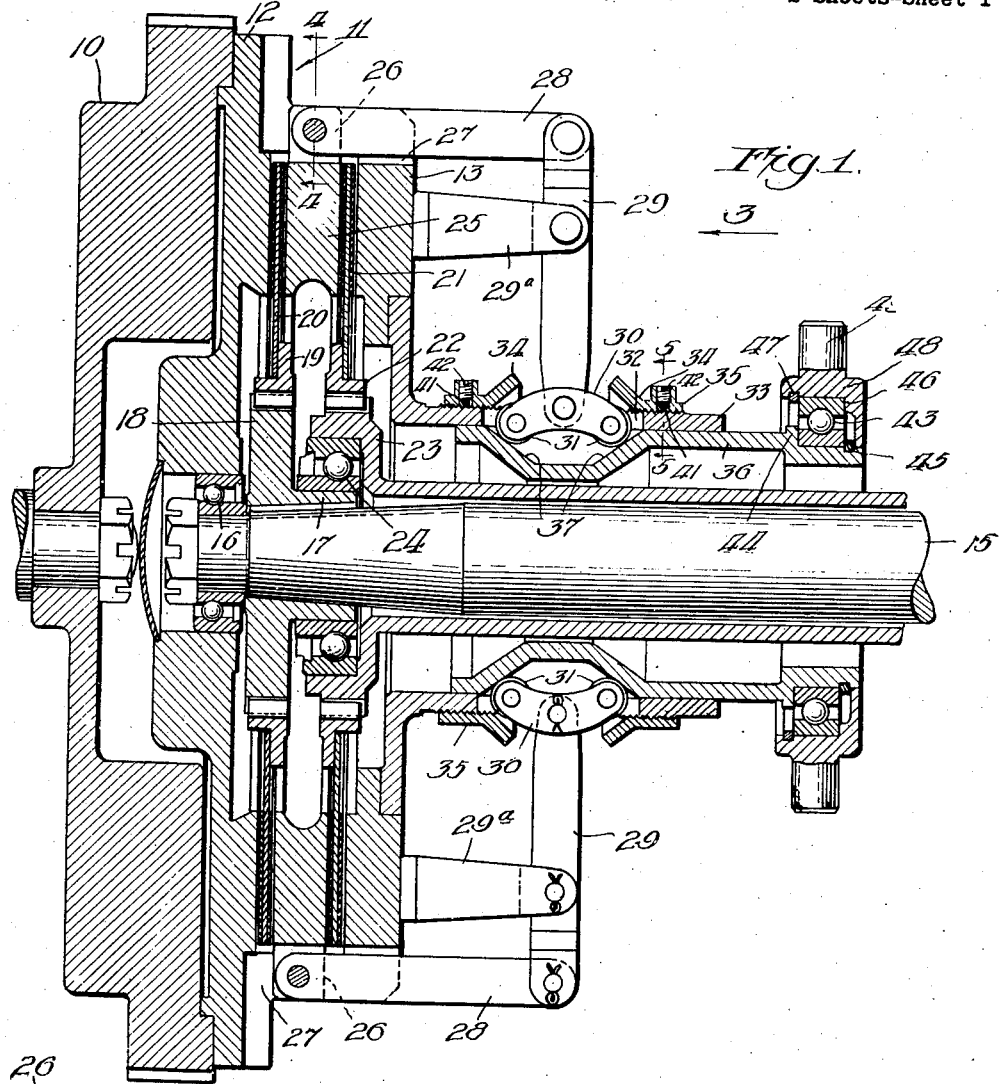
Figure 1 is a sectional elevation of my improved clutch mechanism as taken along the line 1—1 in Fig. 3, looking in the direction of the arrows, the common clamping plate for the clutches being shown in neutral position.
Figure 4:
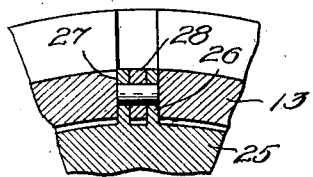
Figure 5:
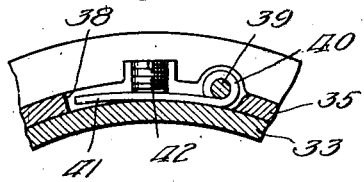

Fig. 4 is a section along the line 4—4 in Fig. 1, looking in the direction of the arrows, and showing the driving connection between the clutch casing and the clamping plate and also the pivotal connection of the operating link to the plate; and Fig. 5 is an enlarged section along the line 5—5 in Fig. 1, looking in the direction of the arrows, and showing the locking means for holding the adjusting rings in any determined position.

Referring to Fig. 1, the numeral 10 designates a driving member, such as a flywheel or other part, which is suitably connected to a power source (not shown). A clutch casing 11, composed of the separable, complementary parts 12 and 13, is secured to one face of the flywheel by bolts 14. It will be understood, however, that the direction of drive through the mechanism hereinafter described may be reversed without disturbing the operating relation of the several components of the mechanism. Accordingly, designation of the flywheel 10 or the clutch casing 11 as a driving element, and also of showing the casing fastened to the flywheel, is intended by way of example only.

One end of a drive shaft 15 is journaled in a bearing 16 carried by the casing part 12 and located in axial alignment with the axis of the flywheel, while the opposite end of the shaft may be appropriately supported in any desired manner. The shaft has keyed thereto adjacent the casing part 12 a hub 17 provided with an externally toothed, annular flange 18 that is in constant mesh with similar teeth provided on the inner periphery of a ring 19 to which is secured a friction disc 20 whose opposite faces may be provided with suitable friction material. The disc 20 is located adjacent the inner face of the casing part 12 and a similar friction disc 21 is disposed adjacent the inner face of the casing part 13. The disc 21 is secured to a ring 22 whose inner periphery has toothed driving engagement with a drive sleeve 23 that surrounds and is concentric with the shaft 15. The sleeve is supported entirely clear of the shaft by means of a bearing 24 which is interposed between the hub 17 and one end of the sleeve and the opposite end is supported by any suitable means (not shown).

The shaft 15 and sleeve 23 might be regarded as elements for transmitting direct and reverse drives, assuming their connection to a proper gear mechanism, or they may be connected to a pair of separate mechanisms which it is desired to selectively operate by engaging either clutch. These two clutches are respectively constituted by the casing part 12 and friction disc 20 and the casing part 13 and friction disc 21. Engagement of these clutches, respectively, is accomplished by means of a common clamping member or plate 25 which is located between the discs 20 and 21. Driving engagement between the plate and the clutch casing is effected by a plurality of circumferentially spaced lugs 26 which extend outwardly from the periphery of the plate through similarly spaced slots 27 cut in the annular wall of the clutch part 13. In the present construction, these clutches are of the dry plate type as permitted by the use of the enclosed clutch casing, but the mechanism may also be designed to provide for an operation of these clutches in oil spray or a dipping in oil, as circumstances may require.

As shown in Fig. 1, the clutches are occupying a neutral position and the distance between the opposed faces of the casing parts 12 and 13 is such that, when the clamping plate is occupying the intermediate position shown, the friction discs 19 and 20 may freely shift endwise to occupy positions out of contact with the faces of the plate 25 and the casing parts 12 and 13.

The engagement of the clutches is effected through a plurality of operators which are equispaced around the shaft 15 and, since each of the operators is identical in construction, it will only be necessary to describe one of them in detail. As many of these operators may be employed as circumstances require and, in the present instance, for example, four of these operators are shown.

Referring to Figs. 1 and 4, the driving lug 26 is intermediately slotted to pivotally receive one end of an operating link 28 that extends toward the right, as viewed in Fig. 1, through the slot 27 for pivotal connection to one arm of a lever 29 that is pivoted between its ends on a bracket 29ᵃ carried by the casing part 13. The inner end of the lever 29 is pivotally connected to the mid-point of a dual link structure 30 and rotatably supported between the elements of the structure at each end thereof is a roller 31. When the parts are occupying the neutral position illustrated in Fig. 1, the link 30 is generally normal to the lever 29 and, due to the mid-point connection of the link to the lever, there is no tendency for either roller 31 to move outwardly under the impulse of centrifugal force. The advantage of this construction will be described more particularly hereinafter.

The inner end of the lever 29 and the link 30 are substantially housed within a chamber defined by a slot 32 cut in the tubular extension 33 which is coaxial with the principal axis of the mechanism and which is carried by the casing part 13, opposed, inclined, annular flanges 34 which are located on opposite sides of the lever 29 and each of which forms part of an adjusting ring 35 that is threaded on the extension 33, and an offset portion of the wall of a sleeve 36 which slides within and is carried by the extension 33 and which offset forms the opposed, inclined walls 37. In the operation of the device, one wall 34 coacts with the adjacent wall 37 and it will be noted that the functional surfaces thereof are V-related for a purpose presently explained.

Each ring 35 is maintained in any adjusted position by cutting a slot 38 (see Fig. 5) from the peripheral wall thereof to a depth sufficient to expose a parti-circular portion of the threads of the extension 33 and a pin 39 is bridged between the walls of the slot. Encircling this pin is one end of a wire 40 whose opposite end is cut to a length sufficient to provide a slender finger 41 which is gripped against the threads of the extension by means of a set screw 42. New positions of the adjusting ring may be effected from time to time simply by withdrawing the set screw sufficently to relieve the pressure of the finger 41, making the adjustment and again clamping the finger in locking position.

In order to shift the sleeve 36 endwise, the inner race of a ball bearing 43 encircles the sleeve between a shoulder 44 provided thereon and a stop ring 45, while the outer race of the bearing is similarly gripped between a shoulder 46 provided on an operating collar 48 and a stop ring 47 carried by the same collar. Trunnion pins 49 are formed on the collar and may be suitably engaged by a shifting fork (not shown) or any other desired operating device.

In describing the operation of my improved mechanism, it will be understood that either inclined wall 37 constitutes the primary element of a device for actuating the operating mechanism represented by the lever 29 and the associated parts and that the wall 34 functions as the secondary element during this operation; also, that, when the parts are occupying the neutral position shown in Fig. 1, the rollers 31 rest upon the surfaces of the walls 37 and so tend to maintain the clamping plate 25 in the neutral position due to the fact that the link 30 is pivoted at its mid-point and hence there is no tendency for this link to rotate about its pivot under the impulse of centrifugal force.

If now it is desired to clamp the friction disc 21 against the casing part 13, the sleeve 36 is moved toward the left, as viewed in Fig. 1, and, during this operation, the right roller 31 rides outwardly along the adjacent wall 37 and eventually bears against the adjacent inclined wall 34 as an abutment to thereby cause a clockwise rocking of the lever 29 and a shifting of the clamping plate 25 toward the right.

During this operation, it will be particularly noted that the right roller 31, while bearing against the wall 34, is also moved toward the left due to the inclination of this wall. This operation is essentially in the nature of a pinching action in which the walls 37 and 34 operate as the jaws of the pincer, but with the wall 37 moving relatively to the other wall. Eventually, the sleeve 36 is moved to the position illustrated in Fig. 2 and, at this time, the right roller 31 rests on the cylindrical surface of the sleeve and bears against the wall 34, so that the operating elements of the clutch are substantially locked in the engaged position.

Figure 2:
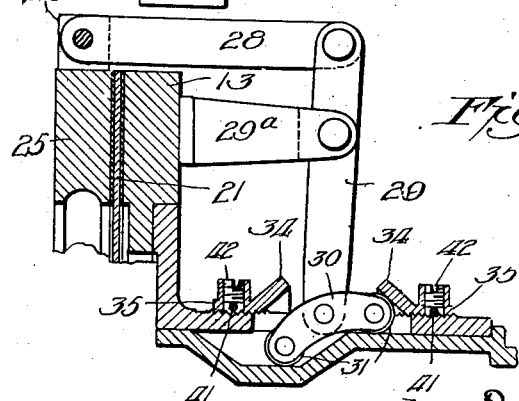
Fig. 2 is a fragmentary, sectional elevation corresponding to that shown in Fig. 1 and illustrating the clamping plate in position to engage one of the clutches.
Figure 3:
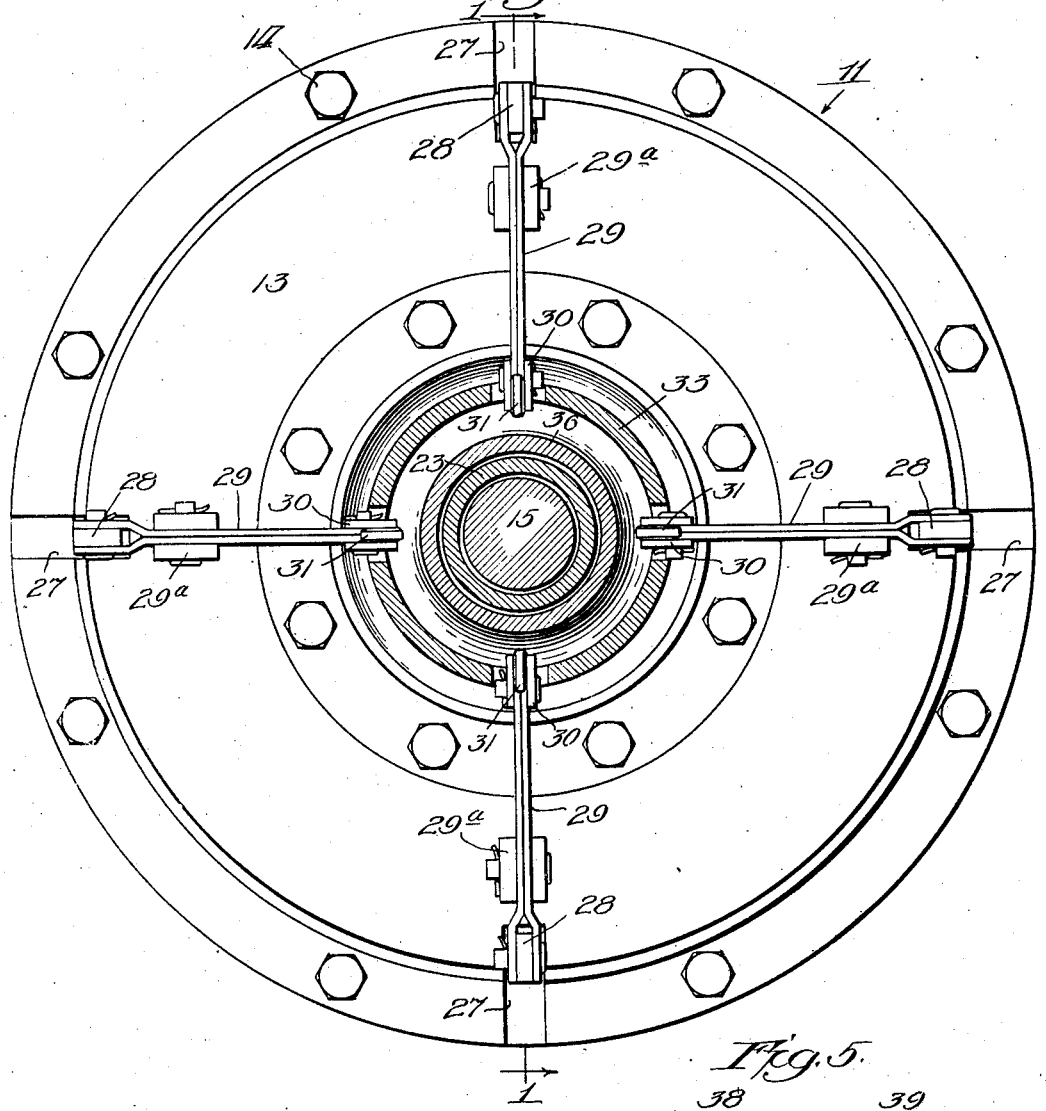
Fig. 3 is an end elevation of the mechanism, partly in section, as viewed in the direction of the arrow 3 in Fig. 1.

When the sleeve is moved from the position illustrated in Fig. 2 toward that illustrated in Fig. 1, the right roller 31 finally rides inwardly along the wall 37 and this action is facilitated by the natural tendency of the clamping plate 25 to release itself as the clamping pressure is decreased.

To engage the other clutch device, it is simply necessary to shift the sleeve 36 toward the right from the position illustrated in Fig. 1, whereupon a similar action will take place, except that, in this case, the left roller 31 cooperates with the left wall 34 and left wall 37.

The foregoing mechanism may be embodied in an arrangement that is quite compact and in which the respective clutches are engaged by the simple operation of shifting the sleeve 36 from one position to another. Due to the relation of the link 30 to the operating lever 29 and of the roller 31 to the coacting, inclined walls 34 and 37, it is possible to lock this clutch in the engaged position, or to maintain the clamping plate in the neutral position without requiring the use of any springs. Any desired endwise movement of the clamping plate 25 may be effected by appropriately relating the angularity of the coacting walls 37 and 34 in conjunction with the length of the arms of the lever 29. Finally, while clutches employing single friction plates have been illustrated, it will be understood that the invention is also capable of adaptation to multiple disc clutches.

I claim:

1. In clutch mechanism, the combination of clutch devices connected to separate rotary parts, a clamping member connected to one of the devices and shiftable to drivably connect both devices, a lever pivoted on one of the devices and connected to the member, a link pivoted on the lever, and means engageable with the free end of the link comprising parts fixed and movable relative to the link, respectively, the movable part swinging the link about its pivot against an inclined surface provided on the fixed part to thereby rock the lever to shift the member to driving position.

2. In clutch mechanism, the combination of clutch devices connected to separate rotary parts, a clamping member connected to one of the devices and shiftable to drivably connect both devices, a lever pivoted on one of the devices and connected to the member, a link pivoted on the lever, and means engageable with the free end of the link comprising parts fixed and movable relative to the link, respectively, the fixed part being carried by an extension provided on one of the devices and the movable part swinging the link about its pivot against an inclined surface provided on the fixed part to thereby rock the lever and shift the member to driving position.

3. In clutch mechanism, the combination of clutch devices connected to separate rotary parts, a clamping member connected to one of the devices and shiftable to drivably connect both devices, a lever pivoted on one of the devices and connected to the member, a link pivoted on the lever, and means engageable with the free end of the link comprising parts fixed and movable relative to the link, respectively, the movable part being supported by an extension provided on one of the devices and swinging the link about its pivot against an inclined surface provided on the fixed part to thereby rock the lever and shift the member to driving position.

4. In clutch mechanism, the combination of clutch devices connected to separate rotary parts, a clamping member connected to one of the devices and shiftable to drivably connect both devices, a lever pivoted on one of the devices and connected to the member, a link pivoted on the lever, and means engageable with the free end of the link comprising parts fixed and movable relative to the link, respectively, both parts being carried by an extension provided on one of the devices and the movable part swinging the link about its pivot against an inclined surface provided on the fixed part to thereby rock the lever and shift the member to driving position.

5. In clutch mechanism, the combination of clutch devices connected to separate rotary parts, a clamping member connected to one of the devices and shiftable to drivably connect both devices, a lever pivoted on one of the devices and connected to the member, a link pivoted on the lever, and pinching means for rocking the lever to shift the member comprising coacting parts having angularly disposed surfaces engageable with an end of the link, one of the parts being movable relative to the other.

6. In clutch mechanism, the combination of clutch devices connected to separate rotary parts, a clamping member connected to one of the devices and shiftable to drivably connect both devices, a lever pivoted on one of the devices and connected to the member, a link pivoted on the lever, and pinching means for shifting the lever to clamping position comprising coacting parts having angularly disposed surfaces engageable with an end of the link, one of the parts being movable relative to the other and the other part being carried by an extension provided on one of the devices.

7. In clutch mechanism, the combination of clutch devices connected to separate rotary parts, a clamping member connected to one of the devices and shiftable to drivably connect both devices, a lever pivoted on one of the devices and connected to the member, a link pivoted on the lever, and pinching means for shifting the lever to clamping position comprising co-acting parts having angularly disposed surfaces engageable with an end of the link, one of the parts being movable relative to the other and both parts being carried by an extension provided on one of the devices.

8. In clutch mechanism, the combination of clutch devices connected to separate rotary parts, one of the devices having a tubular extension coaxial with the principal axis of the mechanism, a clamping member connected to one of the devices and shiftable to drivably connect both devices, a lever pivoted on one of the devices and connected to the member and extending towards the axis, a link pivoted on the lever, a sleeve slidable in the extension, and an adjusting ring threaded on the extension, the sleeve and ring having angularly disposed surfaces engageable with an end of the link to shift the same and the connected lever to clamping position.

9. In clutch mechanism, the combination of clutch devices connected to separate rotary parts, one of the devices having a tubular extension coaxial with the principal axis of the mechanism, a clamping member connected to one of the devices and shiftable to drivably connect both devices, a lever pivoted on one of the devices and connected to the member and extending toward the axis, a link pivoted on the lever, a sleeve slidable in the extension, and an adjusting ring threaded on the extension, a portion of the wall of the sleeve being offset to form a wall angularly disposed to a second wall provided on the ring, and the walls being engageable with the free end of the link to shift the same and the connected lever to clamping position.

10. In clutch mechanism, the combination of a pair of clutches, a clamping member common to both clutches and shiftable to engage either clutch, a lever pivoted on an element forming a part of each clutch and connected to the member, a link intermediately pivoted on the lever, and means engageable with either end of the link comprising a common movable part and a part fixed relative to each link end, the movable part swinging the link about its pivot in either direction against an inclined surface provided on the associated fixed part to thereby rock the lever and shift the member to engaging position.

11. In clutch mechanism, the combination of a pair of clutches, a clamping member common to both clutches and shiftable to engage either clutch, a lever pivoted on an element forming a part of each clutch and connected to the member, a link intermediately pivoted on the lever, and means engageable with either end of the link comprising a common movable part and a part fixed relative to each link end, respectively, and carried by an extension provided on the element, the movable part swinging the link about its pivot in either direction against an inclined surface provided on the associated fixed part to thereby rock the lever and shift the member to engaging position.

12. In clutch mechanism, the combination of a pair of clutches, a clamping member common to both clutches and shiftable to engage either clutch, a lever pivoted on an element forming a part of each clutch and connected to the member, a link intermediately pivoted on the lever, and means engageable with either end of the link comprising a common movable part supported by an extension provided on the element and a part respectively fixed relative to each link end, the movable part swinging the link about its pivot in either direction against an inclined surface provided on the associated fixed part to thereby rock the lever and shift the member to engaging position.

13. In clutch mechanism, the combination of a pair of clutches, a clamping member common to both clutches and shiftable to engage either clutch, a lever pivoted on an element forming a part of each clutch and connected to the member, a link intermediately pivoted on the lever, and means engageable with either end of the link comprising a common movable part and a part respectively fixed relative to each link end, both parts being carried by an extension provided on the element and the movable part swinging the link about its pivot in either direction against an inclined surface provided on the associated fixed part to thereby rock the lever and shift the member to engaging position.

14. In clutch mechanism, the combination of a pair of clutches, a clamping member common to both clutches and shiftable to engage either clutch, a lever pivoted on an element forming a part of each clutch and connected to the member, a link intermediately pivoted on the lever, a tubular extension carried by the element coaxial with the principal axis of the mechanism, a pair of spaced members on the extension each having a wall angularly disposed to the other, and a sleeve slidable in the extension and having a portion of its wall offset to form a pair of spaced walls, each sleeve wall being angularly disposed to an adjacent wall on the extension and acting, respectively, to swing the link about its pivot against the adjacent extension wall when the sleeve is moved in either direction to thereby shift the clamping member to engage the associated clutch.

15. In clutch mechanism, the combination of a pair of clutches, a clamping member common to both clutches and shiftable to engage either clutch, a lever pivoted on an element forming a part of each clutch and connected to the member, a link intermediately pivoted on the lever, a tubular extension carried by the element coaxial with the principal axis of the mechanism, a pair of spaced adjusting rings threaded on the extension each having a wall angularly disposed to the other, and a sleeve slidable in the extension and having a portion of its wall offset to form a pair of spaced walls, each sleeve wall being angularly disposed to an adjacent ring wall and acting, respectively, to swing the link about its pivot against the coacting ring wall when the sleeve is moved in either direction to thereby shift the clamping member to engage the associated clutch.

16. In clutch mechanism, the combination of a pair of clutches, a clamping member common to both clutches and shiftable to engage either clutch, a lever pivoted on an element forming a part of each clutch and connected to the member, a link pivoted at its mid-point on the lever, a tubular extension carried by the element coaxial with the principal axis of the mechanism, a pair of spaced members on the extension each having a wall angularly disposed to the other, and a sleeve slidable in the extension and having a portion of its wall offset to form a pair of spaced walls, each sleeve wall being angularly disposed to an adjacent wall on the extension and being symmetrically disposed relative to the ends of the link, the sleeve walls acting, respectively, to swing the link about its pivot against the coacting extension walls when the sleeve is moved in either direction to thereby shift the clamping member to engage the associated clutch and acting conjointly to maintain the clamping member in neutral position.

17. In clutch mechanism, the combination of clutch devices connected to separate rotary parts, one of the devices having a tubular extension coaxial with the principal axis of the mechanism, a clamping member connected to one of the devices and shiftable to drivably connect both devices, a lever pivoted on one of the devices and connected to the member, a link pivoted on the lever, a sleeve slidable in the extension, and means engageable with the free end of the link comprising a part fixed relative to the link and carried by the tubular extension and a part movable relative to the link and carried by the sleeve, the movable part swinging the link about its pivot against an inclined surface provided on the fixed part to thereby rock the lever and shift the member to driving position.

DONALD W. MORRIS.